INVENTOR.
GERALD C. SUMMERS
BY D. Carl Richards
ATTORNEY

GERALD C. SUMMERS
INVENTOR.

BY D. Carl Richards
ATTORNEY

United States Patent Office 2,768,701
Patented Oct. 30, 1956

2,768,701

MUD CORRECTION FOR VELOCITY WELL LOGGING

Gerald C. Summers, Dallas, Tex., assignor, by mesne assignments, to Socony Mobil Oil Company, Inc., a corporation of New York Application February 24, 1953, Serial No. 338,377

11 Claims. (Cl. 181—.5)

This invention relates to velocity well logging and more particularly to the production of data which is independent of the time of travel of acoustic pulses through liquid paths in a bore hole.

Measurements of pulse travel time or of the seismic velocity of formations adjacent a bore hole may be ambiguous, because, in addition to travel along paths through earth formations, the acoustic energy generally must travel through liquids which may separate an exploring unit from the bore hole walls.

In accordance with the system disclosed in applicant's co-pending application Serial No. 192,750, now Patent No. 2,704,364, issued March 15, 1955, "pulse travel times" are measured by initiating generation of a monotonically varying voltage coincident with the generation at a first point of an acoustic pulse and measuring the magnitude of the monotonically varying voltage at the instant of reception of the acoustic pulse at a second point in the bore hole spaced from the first point. A constant voltage is produced by sampling the monotonically varying voltage at the instant of reception of the acoustic pulse. In the co-pending application of Robert A. Broding, a co-worker of applicant, Serial No. 322,718, filed November 26, 1952, the incremental values of travel time are integrated over a section of the bore hole in order to determine the total time of travel of a pulse over such section. In either case, whether the resultant voltage is proportional to incremental travel time or to an integration product of the travel time voltage, it is desirable to be able to relate the data directly to formation travel and to make it independent of travel through liquid paths. The errors introduced are most serious when the integration step is performed, for in the course of integration the errors are cumulative.

It is an object of the present invention to eliminate the latent ambiguities in velocity logs by reason of acoustic travel paths including portions of variable lengths formed by bore hole liquids. It is a further object of the invention to provide a measurement of incremental travel time that is dependent only upon travel times through earth formations. It is a further object of the invention to provide an exploring system which senses the lengths of the portions of the total travel path formed by liquids and which automatically corrects itself to accommodate such liquid paths and variations in such paths in the production of a log dependent only upon properties of the formations.

More particularly in accordance with the present invention, there is provided a system for measuring the travel time of an acoustic pulse between a pair of electro-acoustic transducers supported for movement along the length of a liquid filled bore hole. A time interval measuring system is connected to one of the transducers and means including a control circuit interconnects the measuring system to the other of the transducers. Means are provided in the control circuit for adjustment of a time delay of signals applied to the control circuit proportional to the portions of the travel path of the acoustic pulse formed by bore hole liquids. In one embodiment of the invention, sensing means are provided for continuously measuring the distances from the transducers to the closest formation point and continuously and variably controlling the delay circuit to correct for variations in bore hole diameter.

For a further understanding of the present invention, reference may now be had to the following description taken in conjunction with the accompanying drawings in which:

Fig. 3 is a time plot of the various critical voltages involved in the measurements in the system of Fig. 1;

Figure 1:
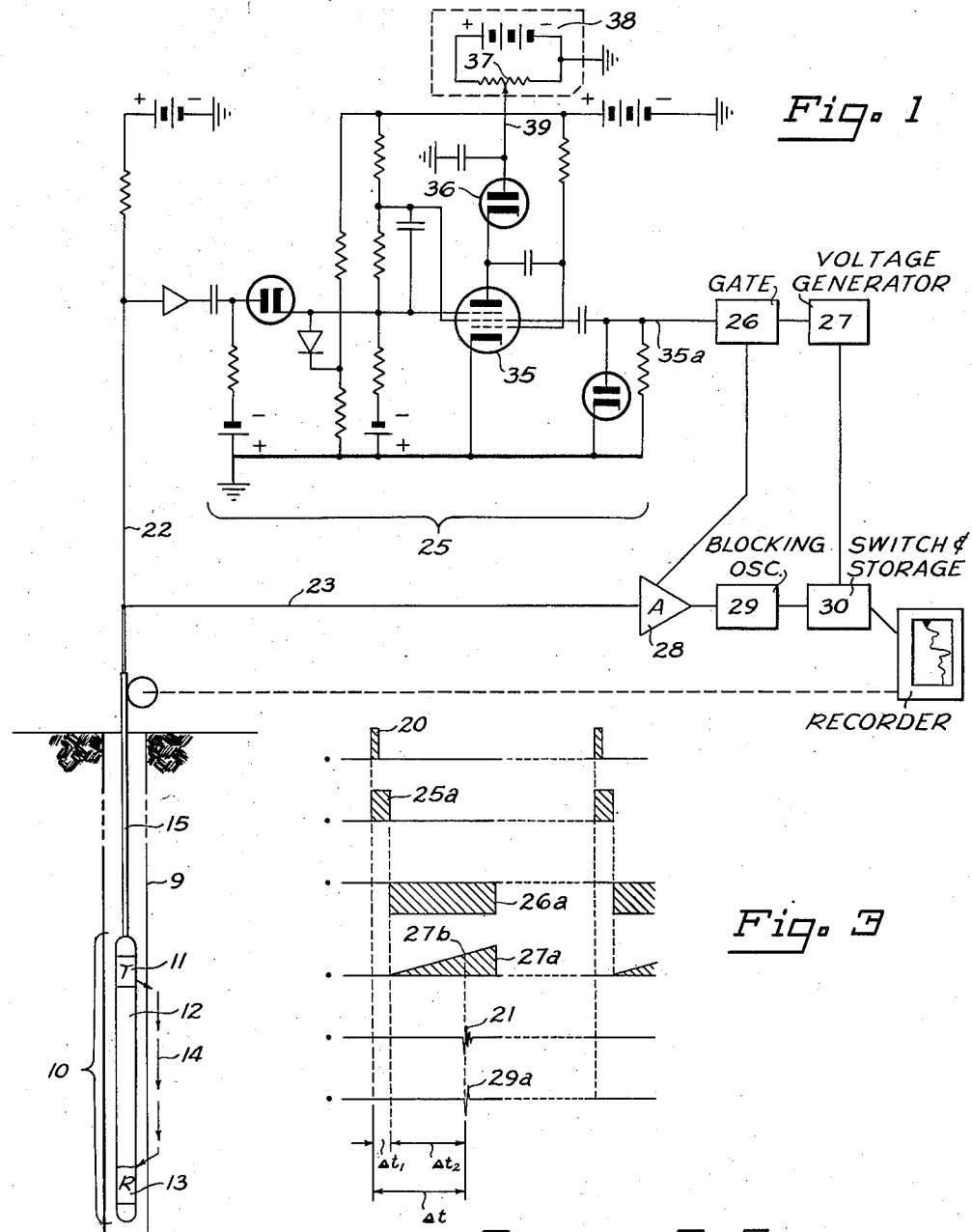
Fig. 1 is a schematic diagram illustrating applicant's well logging system.

This description of the invention may best be followed if it is understood that velocity character of earth formations adjacent bore hole 9 are to be measured by use of an exploring unit 10 in which a pulse transmitter 11 is spaced, by an acoustic insulator 12, a predetermined distance from a receiver 13. An assumed travel path for the acoustic pulse produced by transmitter 11 and sensed by receiver 13 has been indicated by the arrows 14. Of ultimate interest is the time necessary for the pulse to travel through the portion of the path made up of the formations. It is readily seen that the travel path comprises an additional portion formed by the annulus of bore hole fluids surrounding the exploring unit. This is generally so, because guides or bumpers (not shown) are generally provided on the periphery of the unit 10 to maintain at least a minimum spacing between it and the bore hole wall.

Two electrical control pulses are transmitted over a cable 15 to a measuring system at the earth's surface. More particularly referring to Fig. 3, a first pulse 20 coincides in time with the generation of an acoustic pulse by transmitter 11. As a result, an oscillatory pulse 21 is generated by receiver 13 upon reception of the acoustic pulse. Pulse 20 is transmitted by way of conductor 22 to the surface measuring system, and pulse 21 is transmitted by way of conductor 23.

In accordance with the present invention, pulse 20 is utilized in a delay circuit 25. The output of delay circuit 25 controls the initiation of the generation of a monotonically varying voltage produced by the combined action of the gate 26 and the voltage generator 27.

The remainder of the measuring system includes signal amplifier 28, blocking oscillator 29 and the switch and storing unit 30. Quite briefly and as described in greater detail in applicant's co-pending application Serial No. 192,750, the leading edge of a relatively long voltage pulse 26a, Fig. 3, from gate 26 initiates the generation in voltage generator 27 of a monotonically varying voltage function 27a. Application of pulse 21 to amplifier 28 serves to energize the blocking oscillator 29 to produce an output pulse 29a. Pulse 29a actuates a switch and storage unit 30 which momentarily samples the voltage from generator 27 and stores a charge proportional to the magnitude of the latter voltage at the instant of arrival of an acoustic pulse at receiver 13, i. e. at point 27b.

In Fig. 3 the incremental interval or travel time $\Delta t$ represents the time required for a pulse to travel from transmitter 11 to receiver 13. The interval $\Delta t_1$ represents the sum of the intervals required for the acoustic pulse to travel from its source through the bore hole liquid to the adjacent bore hole wall and then for it to travel from the bore hole wall to the receiver 13. The incremental travel time $\Delta t_2$ represents the travel time of the pulse along the portion of the path formed by the formations alone.

In accordance with the present invention a correction is introduced into the system which delays action in the measuring circuit by the time $\Delta t_1$.

More particularly, the delay circuit 25 produces a pulse of the type illustrated by curve 25a which is so applied as to actuate gate 26 at a time $\Delta t_1$ following generation of each acoustic pulse by transmitter 11. One manner of controlling this delay time, found to be particularly satisfactory, involves the use of a pentode 35 in a circuit having phantastron action. The circuit operation is well understood by those skilled in the art, a detailed description being found in "Waveforms," Chance et al. at Sec. 5.15 et seq., volume 19, M. I. T. Radiation Series, McGraw-Hill, 1947. For the present purpose it will be understood that the magnitude of the positive voltage applied through diode 36 to the anode of pentode 35 controls the length of the pulse 25a, Fig 3. As illustrated, a potentiometer 37 is connected in series with a B-supply source such as a battery 38. The variable tap 39 of potentiometer 37 is connected to the anode of diode 36, and the cathode thereof is connected to the anode of pentode 35.

Thus by the action of the phantastron circuit the voltage at the screen grid, and as it appears on output conductor 35a, is a unidirectional pulse of controllable length. The remainder of the system shown in block form in Fig. 1 is shown in detail in Fig. 2. Although construction and operation of the components shown in Fig. 2 are described in detail in applicant's aforementioned Patent No. 2,704,364, the following brief description will be given.

Figure 2:
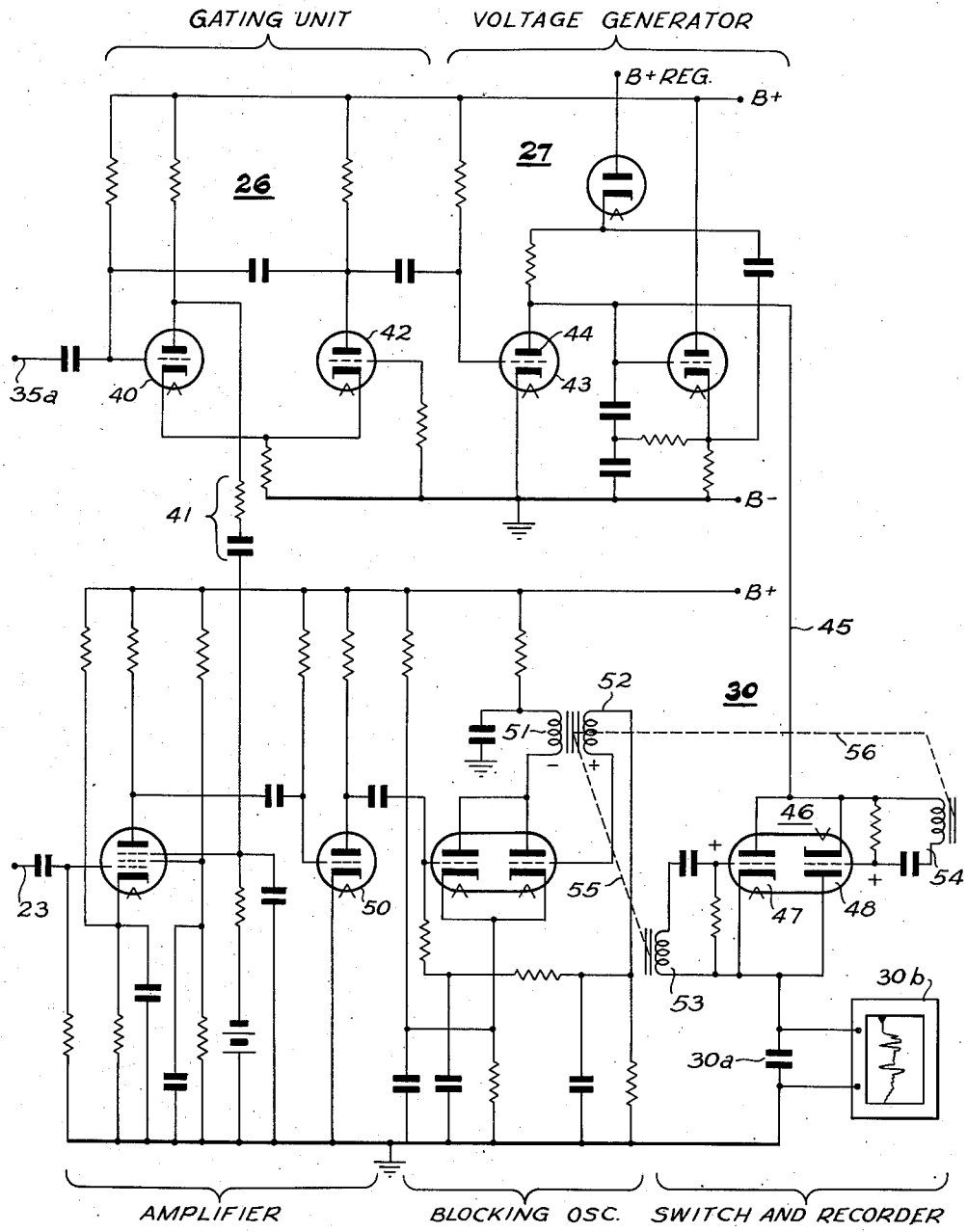
Fig. 2 is a schematic diagram of the portions of Fig. 1 shown in block form only.

In Fig. 2 conductor 35a is connected to the input or control grid of a triode 40 for application of the control pulse thereto. Triode 40 is the input stage of a monostable multivibrator. The anode of the input tube 40 is connected by way of the series connected impedances 41 to a control electrode in amplifier 28 (the suppressor grid in the first tube) to reduce its gain for an interval of selected length after the appearance of each control pulse at the grid of tube 40. The anode of the second tube 42 of gate 26 is coupled to the control grid on the input tube 43 of the voltage generator 27. Generator 27 produces at the anode 44 of tube 43 a voltage which increases linearly as a function of time during the period the gate 26 is in its unstable state. This voltage is applied by way of conductor 45 to a bilaterally conductive switch 46 of the electronic type.

The series connected triodes 47 and 48 form a switch and are normally biased as to be non-conductive. They are both placed in a highly conductive operating condition for only an instant upon arrival of each pulse 21 at the receiver 13. More particularly, the pulse 21 is applied to amplifier 28 by way of conductor 23. The amplified output is applied to a triode 50 which controls a blocking oscillator 29. The anode circuit of the blocking oscillator inclludes a transformer having a primary winding 51 and three secondary windings 52, 53 and 54. The first secondary winding 52 forms the feedback loop for control of the blocking oscillator so that its output appears as the single cycle pulse 29a, Fig. 3. The magnetic coupling, indicated by the dotted lines 55 and 56, to windings 53 and 54 momentarily raises the potentials of the control grids of the triodes 48 and 49.

The switch 46 is connected in series with a charge storage device, a condenser 30a. Upon closure of the switch 46, a charge may flow momentarily onto condenser 30a or from condenser 30a depending upon whether the voltage already appearing across condenser 30a is less than or greater than the voltage appearing between anode 44 and ground.

The recorder 30b, connected across condenser 30a, has an input circuit (not shown) which preferably has high impedance, of the vacuum tube type for example, so that the charge on condenser 30a can be varied appreciably only by passage of current through switch 46.

By this means, even though there is generation of the repeated pulses by the transmitter 11 and although the monotonically varying voltage 27a is repeatedly produced, the charge on condenser 30a remains constant so long as the travel time of a pulse from transmitter 11 to receiver 13 is constant. This charge changes only when there is a change in the incremental travel time. By utilizing the delay system, such as is done in Fig. 1, the voltage on condenser 30a is maintained proportional to $\Delta t_2$, the pulse travel time through formations, and independent of travel time through associated liquid paths.

Incremental travel time logs from many wells have been carefully studied and integrated and the integration products have been checked against conventional geophone well surveys. It has been found that generally over a long bore hole section on the average and for a given exploring instrument a substantially constant error is introduced. In terms of the above discussion this error is the time interval $\Delta t_1$ of Fig. 3. The error, "the formation driving time" for a given instrument, has been found to be in the order of 75 microseconds for a 3⅝" exploring unit. Thus for many logging operations with such a system employing a pulse technique of the type generically disclosed in Fig. 1, the length of pulse 25a may be set for 75 microseconds thereby to yield in the switch and storage unit 30 a constant voltage related only to travel time through formations. The system of Fig. 1 may thus be used to correct for bore hole liquids.

Figures 4, 5:
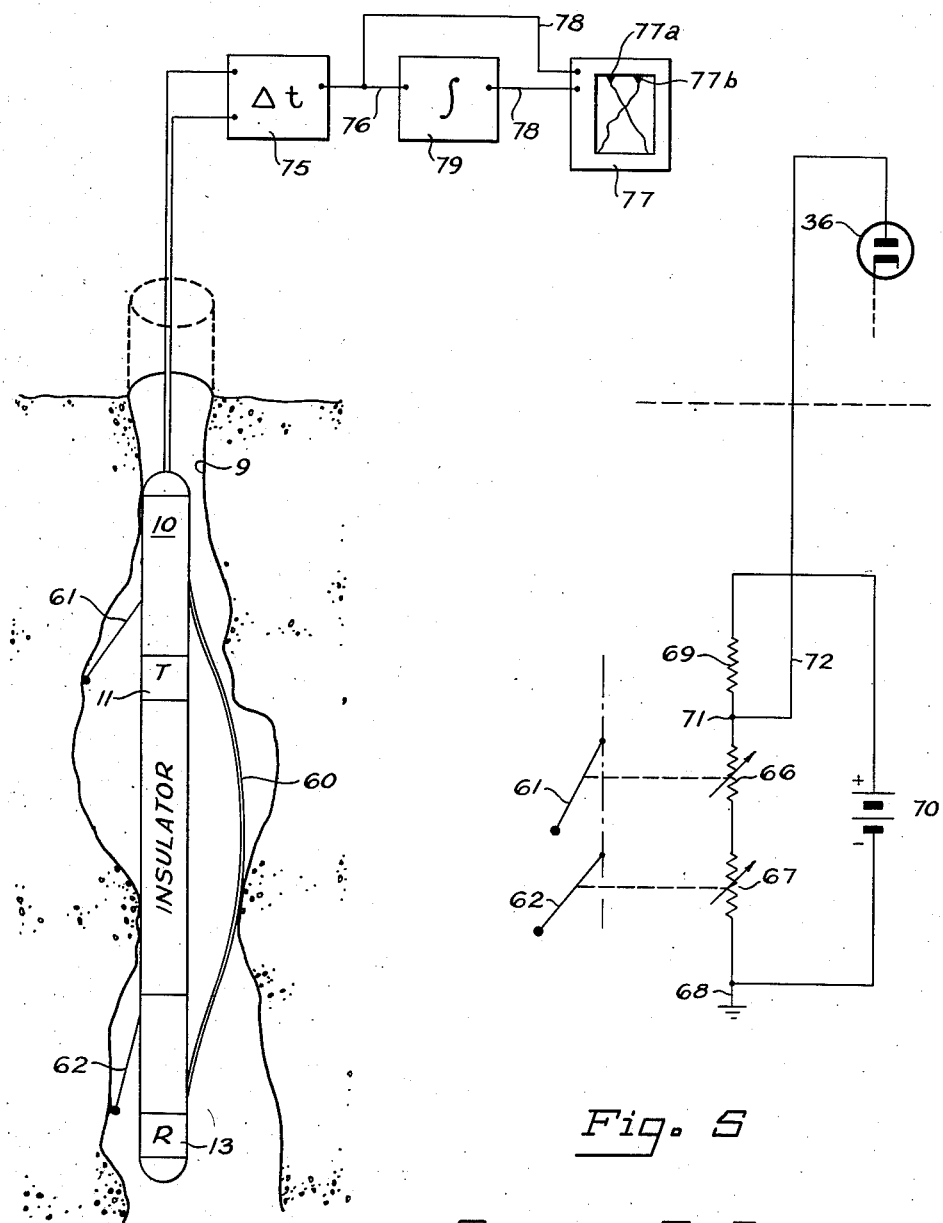
Fig. 4 illustrates a modification of the invention.
Fig. 5 illustrates one manner of controlling the correction factor.

In instances where more detailed velocity data is desired or where variations in bore hole diameter would introduce errors beyond allowable limits in a system of the type shown in Fig. 1 wherein the correction factor is set at a constant value, the provision of an exploring unit of the type generically illustrated in Figs. 4 and 5 may be employed to provide a correction factor which varies in accordance with variations in the length of the fluid portions of the pulse travel path.

More particularly, Fig. 4 illustrates a system for continuously correcting the measuring circuit as a function of bore hole depth so that the time interval $\Delta t_1$ may be accurately relied upon for each depth location of the exploring unit in the bore hole. Where consistent, like parts have been given the same reference characters as in Figs. 1 and 2. The exploring unit 10 is provided with a bow spring device 60 extending along one side thereof to maintain the opposite side in contact with one wall of the bore hole. A pair of caliper arms 61 and 62 are pivotally mounted on the exploring unit and are so arranged as to contact the wall of the bore hole at points opposite the transmitter 11 and the receiver 13, respectively. Suitable mounting systems and supporting means for caliper arms, such as arms 61 and 62, are well understood by those skilled in the art. In accordance with applicant's invention, each of the arms 61 and 62 controls a variable resistance element and thus controls the magnitude of the voltage which in turn controls the operation of the delay circuit. In Fig. 5 a suitable circuit is illustrated in which impedances 66 and 67 are varied under the control of arms 61 and 62. The arms 61 and 62 together with impedances 66 and 67 are shown in their functional relationship. The lower terminal of impedance 67 is connected to the ground terminal 68 which may correspond with the ground potential point of the exploring unit 10 of Fig. 4. The upper terminal of impedance 66 is connected through a fixed impedance 69 which preferably is very large compared to the sum of impedances 66 and 67. Impedance 69 is connected by way of battery 70 to the ground terminal 68. The point, 71, intermediate the impedances 66 and 69, is connected, by way of a bore hole cable circuit which may include the conductor 72, to the anode of diode 36 thereby to control the delay network such as network 25, Fig. 1. The battery 70 and all three associated impedances 66, 67 and 69 may be housed in the exploring unit 10. However, it may be preferred to locate the D. C. source 70 at the earth's surface along with the impedance 69. In either case it should be noted that the voltage appearing between point 71 and the ground potential point 68 is directly proportional to the sum of the distances between transmitter 11 and the bore hole wall and receiver 13 and the bore hole wall. Other suitable means may be utilized to control the delay network. For example, servo systems such as are well known might be utilized as a telemetering link between arms 61 and 62 and the source of potential for the control element in the delay network.

It will now be seen that the system 75, Fig. 4, measures incremental travel time $\Delta t_2$ and thus produces in its output channel 76 a voltage dependent only upon the time required for travel of a pulse through the formations separating transmitter 11 and receiver 13. The output signal may be applied directly to a recorder 77 by way of channel 78 to actuate a first recording pen 77a thereby to produce a log of incremental travel time as a function of depth. The signal on channel 76 may also be applied to an integrator 79 whose output similarly is applied by way of channel 80 to the recorder 77 to actuate a second recording pen 77b to produce a second trace which is a log of total travel time as a function of bore hole depth. Means for mechanically or otherwise coupling the movement of the exploring unit through the bore hole to the chart driving means in recorder 77 has been omitted since such provisions are well understood by those skilled in the art.

While a mechanical system including arms 61 and 62 and their associated circuits has been illustrated in Fig. 4, it is to be understood that in general any means capable of sensing variations in bore hole diameter or lateral bore hole dimensions may be utilized, for example such as disclosed in Patent No. 2,595,241 issued to Goble May 6, 1952. In the latter patent sonar-like transmission and reception of sharp, low power acoustic pulses are utilized to measure distance from a transmitter to the closest earth formation. More particularly and as stated at column 11, line 72, et seq. of the above-identified Goble patent, there is produced a voltage whose amplitude is directly proportional to the distance between transmitting and receiving crystals and the wall of the bore hole. This voltage suitably amplified may be utilized in the same manner as the voltage from battery 70, Fig. 5, which is applied to tube 36, Fig. 5, of the instant disclosure for control of the time delay necessary to compensate for the length of the liquid paths. The arms 61 and 62 mechanically measure the distance from the bore hole tool to the adjacent wall. The system such as disclosed in Goble acoustically measures the distance, producing an output voltage which has a magnitude proportional to such distance.

In the present description a sensing system employing mechanical followers is illustrated and described because of its relative simplicity. The discussion heretofore has related to an acoustic logging system employing a single transmitter and a single receiver. It is apparent that the invention is equally applicable to systems utilizing a pair of receivers such as is sometimes preferred over a single receiver system.

While the invention has been described in detail as to permit one to construct and use the same, modifications may now be apparent to those skilled in the art and it is intended to cover such modifications as fall within the scope of the appended claims.

What is claimed is:

1. In a system for measuring the time required for an acoustic pulse to travel from the location in a liquid filled well bore of a first electro-acoustic transducer to the location in said well bore of a second electro-acoustic transducer for the production of a log of acoustic properties of earth formations, the combination which comprises a measuring system having two inputs and means for producing an output indication proportional to the time interval between excitation pulses applied to said two inputs, a connecting channel extending between the second of said transducers to the second of said inputs for transmission of an excitation pulse thereto upon occurrence of said acoustic pulse at said second transducer, a channel including a delay circuit and extending between the first of said transducers and the first of said inputs for transmission of an excitation pulse thereover in dependence upon the occurrence of said acoustic pulse at said first transducer, and adjustable means in said delay circuit for delaying transmission of said excitation pulse from said first transducer to said first input in proportion to the travel time of said acoustic pulse through liquid paths in said well bore whereby said log is representative of pulse travel time through earth formations only.

2. In a system for measuring the time required for an acoustic pulse to travel from the location in a liquid filled well bore of a first electro-acoustic transducer to the location in said well bore of a second electro-acoustic transducer for the production of a log of acoustic properties of earth formations, the combination which comprises a measuring system having two inputs and means for producing an output indication proportional to the time interval between excitation pulses applied to said two inputs, a connecting channel extending between the second of said transducers to the second of said inputs for transmission of an excitation pulse thereto upon occurrence of said acoustic pulse at said second transducer, a channel including a delay circuit and extending between the first of said transducers and the first of said inputs for transmission of an excitation pulse thereover in dependence upon the occurrence of said acoustic pulse at said first transducer, adjustable means in said delay circuit, and means including sensing means operatively coupled to said adjustable means for sensing the distances from said transducers to the walls of said well bore thereby to activate said adjustable means for delayed transmission of said excitation pulse to said first input in proportion to said distances whereby said log is representative of pulse travel time through earth formations only.

3. In the measurement of the time required for an acoustic pulse to travel from the location in a liquid filled well bore of a first electro-acoustic transducer to the location in said well bore of a second electro-acoustic transducer for the production of a log of acoustic properties of earth formations, the combination which comprises a measuring system having two inputs and means for producing an output indication proportional to the time interval between excitation pulses applied to said two inputs, a connecting channel extending between the second of said transducers to the second of said inputs for transmission of an excitation pulse thereto upon occurrence of said acoustic pulse at said second transducer, a channel including a delay circuit and extending between the first of said transducers and the first of said inputs for transmission of an excitation pulse thereover in dependence upon the occurrence of said acoustic pulse at said first transducer, adjustable means in said delay circuit, arms pivotally supported above said first and second transducers for arcuate movement of the ends thereof with the arc intersecting points defining the separation between said transducers, and a coupling system interconnecting said arms and said adjustable means for controlling said delay circuit in proportion to distances from said points to adjacent bore hole walls thereby to delay transmission of said excitation pulse to said first input whereby said log is representative of pulse travel time through earth formations only.

4. In acoustic well logging wherein an initial electrical pulse is generated coincident with generation of an acoustic pulse in a liquid filled well bore and a second electrical pulse is generated upon reception of said acoustic pulse at a receiver spaced from said transmitter in said bore hole, the combination therewith which comprises a delay circuit connected to said transmitter and responsive to said first electrical pulse for producing a control pulse at its output, a measuring circuit connected to said output and to said detector for measuring the time interval between said control pulse and said second pulse, and means including means for sensing lateral dimensions of said well bore for controlling said delay circuit such that said time delay is proportional to the time of travel of said acoustic pulse over the liquid paths separating said transmitter and receiver from formations nearest thereto.

5. In an acoustic well logging system wherein a voltage varying monotonically in the interval between the generation of an acoustic pulse at a first point in a bore hole and reception of such pulse at a second point in the bore hole is utilized to indicate a velocity characteristic of said formations, the combination therewith which comprises means for sensing variations in bore hole diameter at said first and second points, and means connected to said sensing means for delaying the initiation of generation of said voltage in proportion to the sum of the distances from said transmitter and from said receiver to the nearest formation.

6. In a well logging system wherein a pair of electro-acoustic transducers are maintained a predetermined distance apart and supported for movement in a well bore to measure the time of travel of an acoustic pulse between said transducers, the combination therewith which comprises means for sensing variations in the distances to adjacent walls of the bore hole at points adjacent said transducers, a delay network connected to one of said transducers, and means for coupling said sensing means and said delay network to control it in dependence upon said variations.

7. In a well logging system comprising an acoustic pulse generator and a receiver spaced a predetermined distance apart and a system for measuring the time interval between pairs of excitation pulses, the combination therewith which comprises a channel interconnecting said receiver and said measuring system for applying an excitation pulse thereto upon reception of an acoustic pulse, a transmission channel including delay means interconnecting said generator and said measuring system, sensing means for detecting variations in bore hole diameter at points adjacent said transmitter and said receiver, and means for coupling said sensing means to said delay means for controlling said delay means to delay transmission of an excitation pulse produced in response to said generator to said measuring system in proportion to said variations.

8. The measurement of the travel time of an acoustic pulse from a transmitter supported for movement along a bore hole to a receiver spaced from said transmitter wherein generation of a monotonically varying voltage is initiated in dependence upon pulse generation and is sampled upon reception of said pulse, the method of limiting the generation of said monotonically varying voltage to time intervals related only to travel time of said pulses through formations which comprises sensing the lengths of the shortest acoustic paths from said transmitter and from said receiver to earth formations along said bore hole, and in response to said sensing step delaying the initiation of generation of said monotonically varying voltage in proportion to the sum of said shortest distances.

9. In the measurement of the time required for an acoustic pulse to travel from the location in a liquid filled well bore of a first electro-acoustic transducer to the location in said well bore of a second electro-acoustic transducer for the production of a log of acoustic properties of earth formations, the combination which comprises a measuring system having two inputs and means for producing an output indication proportional to the time interval between excitation pulses applied to said two inputs, a connecting channel extending between the second of said transducers to the second of said inputs for transmission of an excitation pulse thereto upon occurrence of said acoustic pulse at said second transducer, a channel including a delay circuit and extending between the first of said transducers and the first of said inputs for transmission of an excitation pulse thereover in dependence upon the occurrence of said acoustic pulse at said first transducer, adjustable means in said delay circuit, means for sensing lateral bore hole dimensions, and a coupling system interconnecting said last named means and said adjustable means for controlling said delay circuit in proportion to distances from said transducers to adjacent bore hole walls thereby to delay transmission of said excitation pulse to said first input whereby said log is representative of pulse travel time through earth formations only.

10. In a system for measuring the time required for an acoustic pulse to travel from the location in a liquid filled well bore of a first transducer to the location in said well bore of a second transducer for the production of a log of acoustic properties of earth formations, the combination which comprises a measuring system having two inputs and means for producing an output indication proportional to the time interval between excitation pulses applied to said two inputs, a connecting channel extending between the second of said transducers to the second of said inputs for transmission of an excitation pulse thereto upon occurrence of said acoustic pulse at said second transducer, a channel including a delay circuit and extending between the first of said transducers and the first of said inputs for transmission of an excitation pulse thereover in dependence upon the occurrence of said acoustic pulse at said first transducer, and means in said delay circuit for delaying transmission of said excitation pulse from said first transducer to said first input for a time interval related to the time of travel of said acoustic pulse through liquid paths in said well bore whereby said log is representative of pulse travel time through earth formations only.

11. In a system for measuring the time required for an acoustic pulse to travel from the location in a liquid filled well bore of a first transducer to the location in said well bore of a second transducer for the production of a log of acoustic properties of earth formations, the combination which comprises a measuring system having two inputs and means for producing an output indication proportional to the time interval between excitation pulses applied to said two inputs, a connecting channel extending between the second of said transducers to the second of said inputs for transmission of an excitation pulse thereto upon occurrence of said acoustic pulse at said second transducer, a channel including a delay circuit and extending between the first of said transducers and the first of said inputs for transmission of an excitation pulse thereover in dependence upon the occurrence of said acoustic pulse at said first transducer, and means in said delay circuit for delaying transmission of said excitation pulse from said first transducer to said first input for a predetermined time interval proportional to the time of travel of said acoustic pulse through liquid paths in said well bore whereby said log is representative of pulse travel time through earth formations only.

References Cited in the file of this patent

UNITED STATES PATENTS

| | | |
|---|---|---|
| 2,238,991 | Cloud | Apr. 22, 1941 |
| 2,275,736 | Cloud | Mar. 10, 1942 |